United States Patent Office 3,689,431
Patented Sept. 5, 1972

3,689,431
SILICA SOL COMPOSITIONS
Charles C. Payne, Chicago, Ill., assignor to Nalco
Chemical Company, Chicago, Ill.
No Drawing. Filed Feb. 1, 1971, Ser. No. 111,619
Int. Cl. B01j 13/00
U.S. Cl. 252—313 S      3 Claims

ABSTRACT OF THE DISCLOSURE

Silica sol compositions especially useful for coatings are prepared by homogenizing an aqueous silica sol with a silica powder. The compositions are particularly useful for improving the frictionizing of paper.

BACKGROUND

Various articles such as containers fabricated from paper, bags, kraft papers and other types of cellulose materials as used for the packing of foodstuffs, chemicals and the like possess the inherent disadvantage of slipping and sliding against each other. This tendency to slip and/or slide may be undesirable and in many cases harmful. Attempts have been made to overcome this difficulty. For example, containers fabricated from crepe paper or containers treated with a form of an adhesive have been employed. Such containers have not been entirely satisfactory either for reasons of economy, poor printing characteristics, insufficient slip resistance, unpleasant or uncomfortable handling characteristics, or for a combination of such reasons.

Prior art disclosures have shown that it is possible to coat cellulosic materials with colloidal silica sols. These coatings tend to impart definite antiskidding properties to the coated cellulosic materials. The colloidal silica sols are conveniently handled and readily applied to the cellulosic materials. Also from an economic standpoint they are very advantageous. The use of colloidal silica sols to coat paper in order to provide slip resistance is disclosed in U.S. Pats. 2,643,048 and 2,872,094. Colloidal silica sols have also been employed to impart stiffness to paper and generally for the treatment of paper as disclosed in U.S. Pats. 2,833,661, 2,801,938, 2,980,558, and other patents.

The use of colloidal silica sols as a paper coating to provide slip resistance is sometimes referred to as frictionizing the paper or as imparting antiskid or antislip properties thereto. Despite this well known use of colloidal silica sols as surface coatings to impart antislip properties, it would be desirable to provide antislip compositions having enhanced antislip characteristics.

OBJECTS

Accordingly, it is one object of this invention to provide new and improved silica sol compositions which are particularly useful when applied as coatings to cellulosic sheet materials.

Another object of the invention is to provide new and useful silica sol compositions which can be prepared and stored in a concentrated liquid form and diluted for use as coating compositions.

A further object of the invention is to provide a new and improved method for preparing compositions of the type described.

Another object is to provide an improved antislip cellulosic material.

Still a further object is to provide improved antislip cellulosic materials without detrimentally affecting their printing and/or handling characteristics.

BRIEF SUMMARY OF THE INVENTION

In accordance with the invention it has been found that new and useful compositions can be prepared by homogenizing an aqueous colloidal silica sol with a silica powder in proportions which give a synergistic effect in providing enhanced antislip properties when such compositions are diluted with water and applied as coatings to cellulosic sheet materials. Coated cellulosic sheet materials to which said compositions have been applied and thereafter dried have improved antislip characteristics as compared with the colloidal silica sol per se or an aqueous dispersion of the powdered silica per se.

DETAILED DESCRIPTION OF THE INVENTION

The preparation of colloidal silica sols is well known in the art and is described, for example, in U.S. Pats. 3,440,174, 3,462,374, 3,468,813, 3,538,015 and other patents cited therein. In general, silica sols are either cationic sols or anionic sols. In the cationic sols the particles are positively charged and in the anionic sols the particles are negatively charged. For the purpose of this invention any of these types of colloidal silica sols can be used but especially good results have been obtained with anionic silica sols.

Inasmuch as the invention contemplates the preparation of liquid compositions having a relatively high concentration of solids in the form of $SiO_2$, which compositions are capable of being diluted with water before application as coatings, it is desirable to employ as a starting material an aqueous colloidal silica sol containing at least 30% by weight colloidal silica and usually 40% to 50% by weight colloidal silica. A silica powder is then added to the aqueous colloidal silica sol and the entire composition intimately mixed under conditions sufficient to homogenize it.

Silica powders are available commercially in the form of dry powders consisting essentially of $SiO_2$. These powders are sometimes referred to as precipitated silica powders or micronized silica powders or by other terminology. They consist of finely divided silica and the silica particles are usually somewhat agglomerated so that these silica powders when added to water do not entirely remain in suspension. The fineness or coarseness of the silica powder is a factor in determining the conditions required for homogenization. If the silica powder is relatively coarse it may be necessary to use pressures higher than 2000 pounds per square inch in order to homogenize the silica powder with the colloidal silica sol.

The silica particles in the colloidal silica sol will usually have an average diameter within the range of 4 to 120 millimicrons (m$\mu$.). The silica powder particles, when dispersed, should also have an average diameter within the range of 4 to 120 m$\mu$, and preferably within the range of 15 to 50 m$\mu$.

The viscosity of the homogenized concentrate will usually be within the range of 50 to 2000 centipoises at 25° C., depending upon the silica concentration and the ratio of colloidal silica particles from the silica sol to the silica powder particles. When the concentrated composition is diluted with water for application as a coating, the viscosity will normally be below 5 centipoises at 25° C.

Usually, the concentrated composition is diltued with water until the silica content is around 0.5% to 1% by weight.

The ratio of colloidal silica in the colloidal silica sol to silica powder particles in a composition containing at least 30% by weight $SiO_2$ as colloidal silica sol particles should be such as to produce a synergistic effect when the concentrated composition is subsequently diluted and applied to a cellulosic sheet material as a coating. The optimum effect appears to be obtained at a ratio of colloidal silica sol particles to silica powder particles of approximately 4.5:1 under these conditions and within a range of 2:1 to 20:1. If the colloidal silica sol is more dilute, the relative proportion of silica powder particles can be increased but the amounts used should not increase the viscosity beyond 2000 centipoises at 25° C. If the particle diameter is large, the ratio of sol particles to silica powder is about 2:1.

The colloidal silica sol can also contain minor amounts of organic liquids commonly used to prevent freezing which do not affect the stability of the sol, for example, it is permissible to use colloidal silica sols containing 5% to 10% ethylene glycol.

While the pH of the colloidal silica sol is not necessarily critical, optimum results have been obtained by employing colloidal silica sols having a pH within the range of 9 to 10.5.

The quantity of the coating composition applied to a cellulosic sheet material for the purpose of the invention is subject to variation but is preferably 0.05 pound and usually within the range of 0.05 pound to 0.5 pound per 1000 square feet of surface of such material, expressed as $SiO_2$.

The application of the coating is not limited to any special type of cellulosic material but the invention is especially useful for coating cellulosic sheet material employed in making paper bags, cartons, wrapping paper and the like. These sheet materials are made in various weights but the particular weight is not material from the standpoint of the invention. Nor is the chemical treatment of the cellulose used in making paper or similar sheet material critical. Thus, the cellulosic sheet material may be made from unbleached soft wood kraft pulp, sulfite and ground wood pulp blends, ground wood and bleached kraft blends, or the like. It will be recognized that antislip coatings on cartons and bags are particularly important where the cartons and bags are stacked on one another and the coating prevents slipping.

To evaluate the invention, the diluted composition of the type previously described was applied to kraft brown wrapping paper having a weight of 16.4 pounds per 1000 square feet. The coating was applied with a trailing blade coater which is a tool for applying a very uniform layer of coating. The test sheets were 9 inches by 12 inches. A center section of 5 inches by 10 inches was cut from the test sheet after coating. This center section was then cut in half to make two sheets of 5 inches by 5 inches. This sheet was then ready for the slide angle tester to be described later.

The coating comprised a flexible trailing blade fitted with a rubber covered backup cylinder and hand crank. The coating was applied to the leading edge of the test sheet with a dropper and then spread evenly over the sheet by the coating blade as the backup cylinder and the test sheet were rotated past the blade.

After the paper was coated the treated paper and a water treated blank were equilibrated at ambient temperatures and humidity for at least 24 hours.

The finally dried coated papers and blank papers were then subjected to testing on a slide angle tester. Each sheet was tested for the critical angle data, i.e., the angle at which the test block slides down the plane on a St. Regis slide angle tester, Model CS–152 using the suggested TAPPI method T503su–67.

The St. Regis slide angle tester may be generally described as comprising a sled and an incline plane.

The sled is a metal block preferably rectangular with a flat plane lower surface, 8.9±1.3 centimeters (3.5±0.5 inches) wide and 10.2±2.5 centimeters (4.0±1.0 inches) long and of such weight as to provide a measure of 14±3 grams per centimeters squared (0.2±0.04 p.s.i.) when horizontal.

The sled must also include a means for clamping the leading edge of the test specimen to the front or to the top surface of the sled.

The inclined plane is a plain surface hinged so it can be tilted with a smooth incompressible top surface of nonmagnetic material having a width of at least 1 inch wider than the sled and a length sufficient to permit the sled to move at least ½ inch and provided with a clamp from the test specimen at the upper end of the plane (and with a bumper stop at the lower end). Also, the incline plane should include a means to indicate the angle of displacement of the plane within 0.5° and some means for smoothly increasing the inclination of the plane from horizontal to an arc of at least 45° at a rate of 1.5±0.5° per second.

Test sheets of paper are cut and affixed to the sled. They are cut so that they are a little larger than the contacting area so that the sheet will extend slightly beyond the bottom edge of the sled.

The outer sheet is cut to be affixed to the surface of the plane. It is cut large enough to cover at least the working surface of the plane.

The plane is leveled so that it is horizontal when the inclinometer indicates zero.

One sheet is mounted on the plane with the machine direction parallel to the direction of the slide and with the surface to be tested facing upwards. The other sheets are attached to the sled. The sled is then positioned on the top of the lower sheet with its crosswise direction parallel to the direction of the slide and with the surface to be tested facing downward. Likewise, surfaces of the specimen are now in contact with their machine directions at right angles.

There is allowed a dwell time of 30±5 seconds, then the plane is inclined at the specified rate of 1.5±0.5° per second. The inclinator is stopped when the sled starts to move. The sled is permitted to slide until it stops. The slide angle $\theta$ is recorded to the nearest 0.1°. At this point the sled is lifted along with the attached specimen and the entire assembly is placed at the original starting position with the plane in its horizontal position.

In order to determine the retention of antiskid properties when subjected to continual sliding the tested paper was subjected to 10 successive slides. After the 10 successive slides the paper was once again tested for its critical or slide angle $\theta$.

The best mode contemplated for the practice of the invention is illustrated by the following examples in which the quantities are stated in parts by weight unless otherwise indicated.

EXAMPLE I

A composition was prepared by homogenizing under a pressure of 2000 to 3000 p.s.i. an aqueous anionic colloidal silica sol (NALCO 1050) consisting essentially of 50% $SiO_2$ with particles having an average diameter of about 20 millimicrons, 40% water and 10% ethylene glycol, with a fine silica powder (Quso G–30) in proportions such that the resultant composition contained 40% by weight $SiO_2$ from the silica sol and 10% $SiO_2$ from the powdered silica. The homogenization was carried out at ambient temperatures and a homogeneous product was obtained in which the silica particles remained in suspension.

The composition prepared as above described was diluted to a solids content of 0.5% by adding water. In the 0.5% solution 0.41% of the $SiO_2$ was due to the silica sol and 0.09% of the $SiO_2$ was due to the silica powder. This composition was then coated on kraft brown wrapping paper and evaluated on a slide angle tester in the manner previously described. A test was also run with a blank in the manner previously described and with a solution of silica sol containing 0.41 $SiO_2$ and an aqueous solution contaiinng 0.09% of the silica powder. The same liquid carrier was used in all preparations. The results obtained were as follows:

| Sample | Average angle | Δ angle (subtracted from blank), deg. |
|---|---|---|
| Blank | 35.4 | 0.0 |
| 0.41% 1050 | 37.0 | 1.6 |
| 0.09% G-30 | 35.4 | 0.0 |
| Total | | 1.6 |
| 0.5% 1050 + G-30 mixture containing 0.41% 1050 + 0.09% G-30 | 39.3 | 3.9 |

NOTE.—Angle increase for mixture=3.9°−1.6°=2.3°.

The foregoing results show that the silica sol alone increased the antislip resistance of the coating. The fine silica powder alone had no effect in increasing the antislip resistance but the combination of the silica sol and the fine silica powder more than doubled the increment of antislip resistance attributable to the silica sol alone.

EXAMPLE II

The procedure was the same as in Example I except that the concentrated solution was diluted to a 1% solution and applied as a coating to kraft brown wrapping paper. Upon evaluation in the manner previously described the following results were obtained.

| Sample | Average angle | Δ angle (subtracted from blank), deg. |
|---|---|---|
| 0.82% 1050 | 38.0 | 2.6 |
| 0.18% G-30 | 36.6 | 1.2 |
| Total | | 3.8 |
| 1.0% 1050 + G-30 mixture containing 0.82% 1050 + 0.18% G-30 | 40.2 | 4.8 |

Angle increase for mixture=4.8°−3.8°=1.0°.

In this case there was an increase in antislip resistance attributable both to the silica sol alone and the powdered silica alone but the combination of the two in the same relative proportions gave a substantial improvement in antislip resistance.

While the optimum synergistic effect appears to be obtained at a weight ratio of silica from colloidal silica sol to silica from powdered silica within the range of 4:1 to 6:1, the usual range is within the range of 4:1 to 10:1.

The addition of the fine powder silica has a thickening effect and the amount which can be used without actually increasing the viscosity will not ordinarily be more than 25% by weight of the total composition.

It will be understood that the pressures used in homogenizing the colloidal silica sol and the fine silica powder are subject to variation but ordinarily superatmospheric pressures are required.

The concentrated compositions will normally contain at least 30% by weight $SiO_2$ and usually amounts of $SiO_2$ within the range of 30% to 65%. These concentrated compositions can be stored and shipped in their concentrated form and later diluted by the user for application to cellulosic materials.

The term "cellulosic material" as used herein is intended to include and cover a material made primarily from cellulose. The principal use of the compositions is to provide antislip resistance to felted cellulose fibers such as paper. However, they can also be applied to textiles and other felted or woven materials and in other applications where antislip resistance is desired.

The invention is hereby claimed as follows:

1. A composition consisting essentially of a homogenized liquid mixture of an aqueous colloidal silica sol and a fine silica powder, the silica particles of said colloidal sol and said silica powder having an average diameter within the range of 4 to 120 millimicrons, and the relative proportions of said colloidal silica sol and said fine silica powder being sufficient to produce a synergistic enhanced antislip effect when said composition diluted with water to 0.5% to 1% by weight $SiO_2$ is applied as a coating to a cellulosic surface at the rate of 0.05 pound to 0.5 pound per 1000 ft.$^2$ of said surface, expressed as $SiO_2$ and allowed to dry, the concentration of $SiO_2$ in said composition being at least 30% by weight, the weight ratio of $SiO_2$ from the aqueous colloidal sol to $SiO_2$ fine silica powder being within the range of 2:1 to 20:1, and the pH being within the range of 9 to 10.5.

2. A composition as claimed in claim 1 in which the concentration of $SiO_2$ is within the range of 30% to 65%.

3. A composition as claimed in claim 1 in which the weight ratio of $SiO_2$ from the aqueous colloidal sol to $SiO_2$ fine silica powder is approximately 4:1 to 6:1.

References Cited

UNITED STATES PATENTS 2,661,438  12/1953  Shand _____ 252—313 S
2,984,629  5/1961  Loftman et al. _____ 252—313 S RICHARD D. LOVERING, Primary Examiner U.S. Cl. X.R.

106—36; 117—152; 252—306